(No Model.) 2 Sheets—Sheet 1.

F. A. CARLSON.
PISTON ROD PACKING.

No. 427,045. Patented May 6, 1890.

Witnesses
M. A. Harris
K. Donovan

Inventor
Frank A. Carlson
M. B. Harris
Attorney (No Model.) 2 Sheets—Sheet 2.

F. A. CARLSON.
PISTON ROD PACKING.

No. 427,045. Patented May 6, 1890.

WITNESSES
M. A. Harris
H. Donovan

INVENTOR
Frank A. Carlson
M. B. Harris
ATTORNEY

UNITED STATES PATENT OFFICE.

FRANK A. CARLSON, OF DALLAS, TEXAS.

PISTON-ROD PACKING.

SPECIFICATION forming part of Letters Patent No. 427,045, dated May 6, 1890.

Application filed August 15, 1889. Serial No. 320,849. (No model.)

*To all whom it may concern:*

Be it known that I, FRANK A. CARLSON, a citizen of the United States, residing at Dallas, in the county of Dallas and State of Texas, have invented certain new and useful Improvements in Piston-Rod Packing; and I do hereby declare the following to be a full, clear, and exact description of the invention, such as will enable others skilled in the art to which it appertains to make and use the same.

My invention has relation to packing for piston-rods, and is designed more especially for piston-rods of locomotives; and it consists in the construction and novel combination of parts, as will be hereinafter more fully described, illustrated in the accompanying drawings, and pointed out in the appended claim.

The objects of my invention are, first, to provide a metallic packing for piston-rods that is self-adjusting; secondly, to provide a packing the parts of which are so arranged as to avoid any escape of steam through the gland of the stuffing-box; thirdly, to provide a packing that does not require a lubricator; fourthly, to provide a packing that relieves the piston of all friction, except when steam is admitted to stuffing-box end of cylinder.

Figure 1:
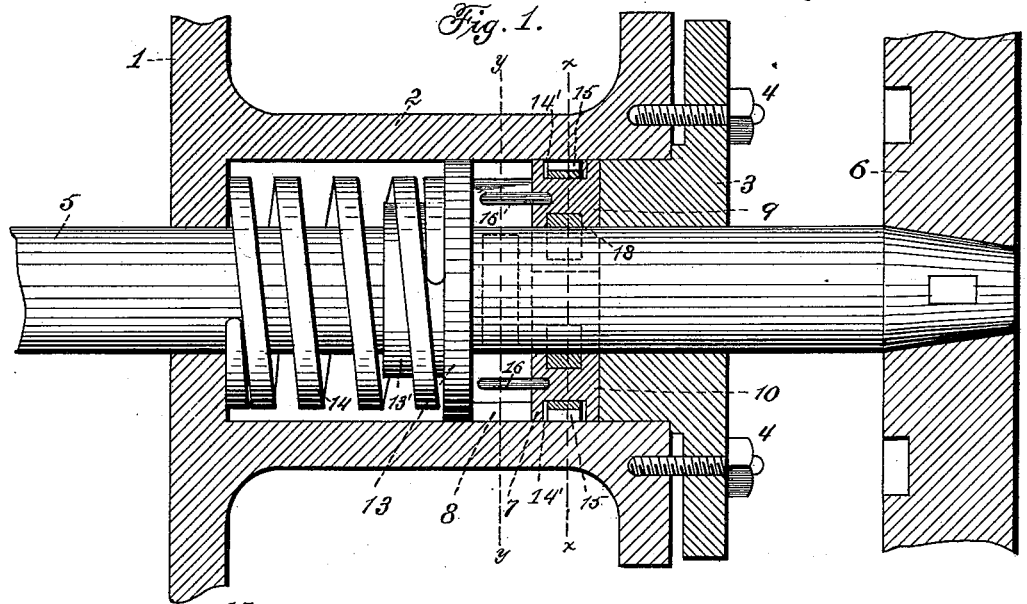
Figure 2:
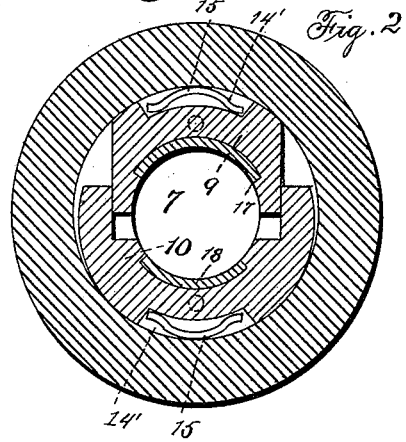
Figure 3:
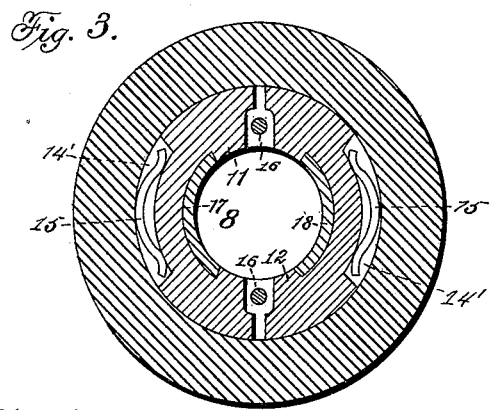
Figure 4:
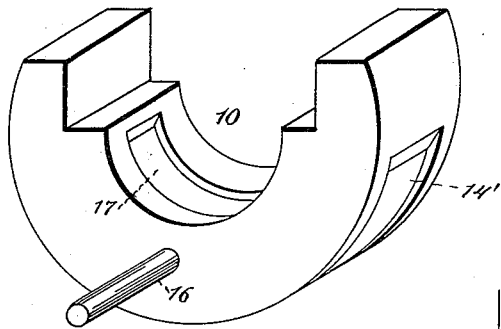
Figure 5:
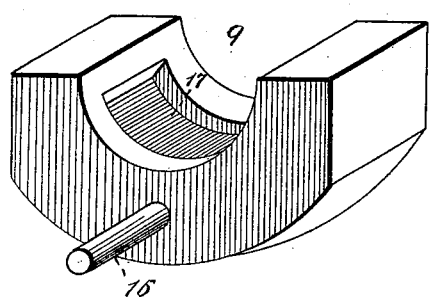
Figure 6:
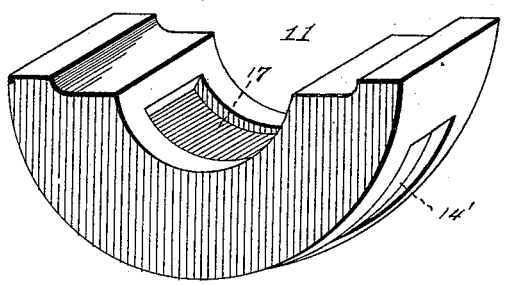
Figure 7:
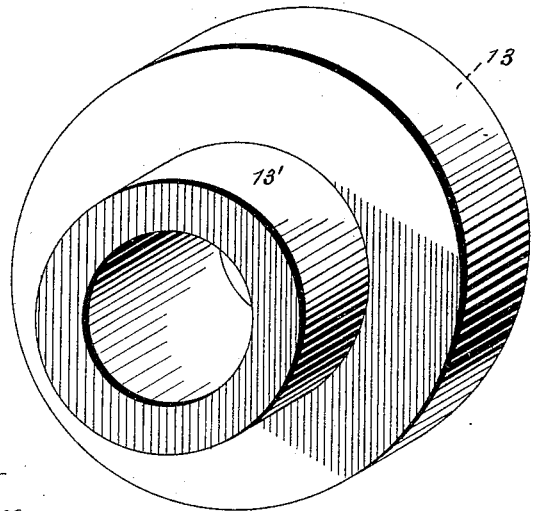

In the accompanying drawings, Figure 1 is a longitudinal section of a stuffing-box, showing my improved packing in section. Fig. 2 is a transverse section on the line x x of Fig. 1; Fig. 3, a transverse section on the line y y of Fig. 1; Fig. 4, a detail view of the female section of ring 7; Fig. 5, a detail view of the male section of ring 7; Fig. 6, a detail view of one of the sections of ring 8; Fig. 7, a detail view of follower.

Referring to the drawings, in which like numerals indicate corresponding parts in all the figures, 1 indicates the cylinder-head of a locomotive having made integral therewith on its outer face the stuffing-box 2, provided with the usual gland 3, secured in place by the bolts 4. 5 indicates the piston-rod passing through suitable openings in the cylinder-head and gland, and has secured upon its outer end the cross-head 6.

In making my improved metallic packing I prefer to form it of the sectional rings 7 and 8, the outer ring 7, which is composed of the male and female members 9 and 10, the inner ring formed of the equal sections 11 and 12, designed to abut against the inner face of the outer sectional ring.

For holding the several parts of my improved packing against the gland and thus insure any possibility of steam escaping, I provide a follower 13, having an integral sleeve 13'.

14 indicates a follower-spring placed between the cylinder-head and over the sleeve 13' of the follower 13.

In order that the sections 9, 10, 11, and 12 of the rings 7 and 8 may be held firmly against the piston, I provide the sections of said rings in their outer edges with recesses 14', in which are placed the leaf-springs 15, designed to press against the inner wall of the stuffing-box 2, and to prevent the seams or meeting edges of the said ring-sections coming opposite each other, and thus insure a perfect steam-tight joint, I provide the male and female members of the outer ring 7 on their inner faces with dowels 16, designed to pass between the meeting edges of the sections 11 and 12 of the inner ring 8.

To prevent the ring-sections from becoming unduly heated and binding on the piston, I provide said sections on their inner edges with recesses 17, filled with Babbitt metal 18.

The several parts of my improved packing having been placed in position in the stuffing-box around the piston-rod, the gland 3 is then secured in place, and the desired tension may be placed on the coil-spring by the bolts 4, which will hold the ring-sections tightly against the gland.

Having described my invention, what I claim, and desire to secure by Letters Patent, is—

In a piston-rod packing, the combination, with a cylinder-head, the stuffing-box 2, and gland 3, adapted to have a longitudinal adjustment by means of the adjusting-bolts 4, and the piston-rod 5, passing through the cylinder-head and gland, of the ring 7, consisting of the male and female sections 9 10, placed around the piston and against the gland 3, the ring 8, consisting of the equal sections 11 12 in rear of ring 7, the dowel-pins 16, carried by the sections 9 10 and passing between the meeting edges of the sections 11

12, the recesses 14′, provided in the outer face of the sections 9 10 11 12, and the leaf-springs 15, located in said recesses, and the recesses on the inner faces of said sections filled with Babbitt metal, the flanged follower 13, mounted on the piston-rod in rear of ring 8, and the follower-spring 14, located between the follower and cylinder-head, all of said parts being constructed and operated substantially in the manner described.

In testimony whereof I affix my signature in presence of two witnesses.

FRANK A. CARLSON.

Witnesses:
   JOHN COPPIN,
   R. A. DEAN.